US011920532B2

(12) United States Patent
Aoki

(10) Patent No.: US 11,920,532 B2
(45) Date of Patent: Mar. 5, 2024

(54) EXHAUST GAS CONTROL APPARATUS FOR INTERNAL COMBUSTION ENGINE AND EXHAUST GAS CONTROL METHOD FOR THE SAME

(71) Applicant: TOYOTA JIDOSHA KABUSHIKI KAISHA, Toyota (JP)

(72) Inventor: Keiichiro Aoki, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/316,158

(22) Filed: May 11, 2023

(65) Prior Publication Data

US 2024/0018918 A1 Jan. 18, 2024

(30) Foreign Application Priority Data

Jul. 13, 2022 (JP) ................................ 2022-112622

(51) Int. Cl.
*F02D 11/00* (2006.01)
*F01N 11/00* (2006.01)
*F02D 41/02* (2006.01)

(52) U.S. Cl.
CPC ........ *F02D 41/0235* (2013.01); *F01N 11/002* (2013.01); *F01N 2550/02* (2013.01); *F02D 2200/0802* (2013.01)

(58) Field of Classification Search
CPC ......... F02D 41/0235; F02D 2200/0802; F01N 11/002; F01N 2550/02; F01N 3/101;
(Continued)

(56) References Cited

U.S. PATENT DOCUMENTS 6,220,017 B1 4/2001 Tayama et al.
6,266,957 B1 * 7/2001 Nozawa ................ F02M 26/01 60/284
(Continued)

FOREIGN PATENT DOCUMENTS

JP 2000-008920 A 1/2000
JP 2007038121 A * 2/2007
(Continued)

OTHER PUBLICATIONS

Sasaki, T et al., "Development of a Lamination Type Air Fuel Ratio Sensor for the Next Generation" Transactions of the Society of Automotive Engineers of Japan, vol. 41, No. 4, Jul. 2010, pp. 833-837.

*Primary Examiner* — Matthew T Largi
(74) *Attorney, Agent, or Firm* — Finnegan, Henderson, Farabow, Garrett & Dunner, LLP

(57) ABSTRACT

An exhaust gas control apparatus for an internal combustion engine includes: a catalyst which is capable of storing oxygen; a downstream air-fuel ratio sensor that detects the air-fuel ratio of outgoing exhaust gas flowing out of the catalyst; an air-fuel ratio control unit that controls the air-fuel ratio of incoming exhaust gas flowing into the catalyst; and a catalyst state estimation unit that estimates the activity of the catalyst. The air-fuel ratio control unit controls the air-fuel ratio of the incoming exhaust gas so that the air-fuel ratio of the outgoing exhaust gas detected by the downstream air-fuel ratio sensor is maintained at a target air-fuel ratio. The air-fuel ratio control unit sets the target air-fuel ratio to a richer value when the activity of the catalyst is equal to or higher than a predetermined value than when the activity of the catalyst is lower than the predetermined value.

8 Claims, 9 Drawing Sheets

(58) Field of Classification Search
CPC ..... F01N 2900/0414; F01N 2900/0416; F01N 2900/1402; F01N 2900/1404; F01N 2900/1626
See application file for complete search history.

(56) References Cited

U.S. PATENT DOCUMENTS

| | | | | |
|---|---|---|---|---|
| 2003/0089100 A1* | 5/2003 | Ueno | F01N 3/0814 | 73/23.31 |
| 2009/0019832 A1* | 1/2009 | Katoh | F01N 11/00 | 60/299 |
| 2010/0235072 A1* | 9/2010 | Okazaki | F02D 41/0042 | 701/106 |
| 2015/0184605 A1* | 7/2015 | Matsumura | F02D 41/061 | 60/285 |

FOREIGN PATENT DOCUMENTS

| | | | | |
|---|---|---|---|---|
| JP | 2008-128110 A | | 6/2008 | |
| JP | 2011-069835 A | | 4/2011 | |
| JP | 2020185965 A | * | 11/2020 | B60W 20/00 |
| KR | 20110126402 A | * | 11/2011 | |

* cited by examiner

FIG. 10

| | | | | | | |
|---|---|---|---|---|---|---|
| CDA | 5000 | 10000 | 20000 | 30000 | 40000 | 50000 |
| TAF | 14.6 | 14.598 | 14.595 | 14.59 | 14.585 | 14.58 |

FIG. 11

| | | | | | | |
|---|---|---|---|---|---|---|
| CDA | 30000 | 60000 | 90000 | 120000 | 150000 | 180000 |
| TAF | 14.6 | 14.598 | 14.595 | 14.59 | 14.585 | 14.58 |

FIG. 12

| | | | | | | |
|---|---|---|---|---|---|---|
| TCAT[°C] | 300 | 400 | 500 | 600 | 700 | 800 |
| KT | 1 | 1.1 | 1.2 | 1.5 | 2 | 3 |

FIG. 13

| | | | | | |
|---|---|---|---|---|---|
| AFup | 14.6 | 14.8 | 15 | 15.5 | 16 |
| KL | 1 | 1.2 | 1.5 | 2 | 3 |

EXHAUST GAS CONTROL APPARATUS FOR INTERNAL COMBUSTION ENGINE AND EXHAUST GAS CONTROL METHOD FOR THE SAME

CROSS-REFERENCE TO RELATED APPLICATION

This application claims priority to Japanese Patent Application No. 2022-112622 filed on Jul. 13, 2022, incorporated herein by reference in its entirety.

BACKGROUND

1. Technical Field

The present disclosure relates to exhaust gas control apparatuses for internal combustion engines and exhaust gas control methods for the exhaust gas control apparatuses.

2. Description of Related Art

It is conventionally known to improve the exhaust gas control performance of a catalyst by controlling, based on the output of an air-fuel ratio sensor, the air-fuel ratio of exhaust gas flowing into the catalyst placed in an exhaust passage of an internal combustion engine.

As a problem that occurs when such control is performed, Japanese Unexamined Patent Application Publication No. 2011-069835 (JP 2011-069835 A) and "Development of a Lamination Type Air Fuel Ratio Sensor for the Next Generation," Vol. 41, No. 4, July 2010 describe that a deviation is caused in the output of an air-fuel ratio sensor as an adsorption species in exhaust gas is adsorbed on a sensor element, and Japanese Unexamined Patent Application Publication No. 2000-008920 (JP 2000-008920 A) and Japanese Unexamined Patent Application Publication No. 2008-128110 (JP 2008-128110 A) describe that a deviation is caused in the output of a downstream air-fuel ratio sensor disposed downstream of a catalyst due to the influence of hydrogen produced in the catalyst.

SUMMARY

However, when the activity of a catalyst is low, such as immediately after an internal combustion engine is started, the reactivities of a water-gas shift reaction and a steam reforming reaction for producing hydrogen decrease, and the amount of hydrogen produced in the catalyst decreases. Accordingly, the amount of hydrogen that flows out of the catalyst into a downstream air-fuel ratio sensor changes according to the activity of the catalyst, and the amount of deviation of the output from the downstream air-fuel ratio sensor changes accordingly.

It is therefore necessary to reduce degradation in exhaust emissions due to the influence of hydrogen by performing appropriate air-fuel ratio control according to the activity of the catalyst.

A first aspect of the present disclosure relates to an exhaust gas control apparatus for an internal combustion engine that includes a catalyst, a downstream air-fuel ratio sensor, an air-fuel ratio control unit, and a catalyst state estimation unit. The catalyst is disposed in an exhaust passage of the internal combustion engine and is configured to store oxygen. The downstream air-fuel ratio sensor is configured to detect an air-fuel ratio of outgoing exhaust gas flowing out of the catalyst. The air-fuel ratio control unit is configured to control an air-fuel ratio of incoming exhaust gas flowing into the catalyst. The catalyst state estimation unit is configured to estimate activity of the catalyst. The air-fuel ratio control unit is configured to control the air-fuel ratio of the incoming exhaust gas such that the air-fuel ratio of the outgoing exhaust gas detected by the downstream air-fuel ratio sensor is maintained at a target air-fuel ratio. The air-fuel ratio control unit is configured to set the target air-fuel ratio to a richer value when the activity of the catalyst is equal to or higher than a predetermined value than when the activity of the catalyst is lower than the predetermined value.

In the exhaust gas control apparatus according to the first aspect, the catalyst state estimation unit may be configured to estimate the activity of the catalyst based on a temperature of the catalyst. The air-fuel ratio control unit may be configured to set the target air-fuel ratio to a richer value when the temperature of the catalyst is equal to or higher than a predetermined temperature than when the temperature of the catalyst is lower than the predetermined temperature.

In the exhaust gas control apparatus according to the first aspect, the catalyst state estimation unit may be configured to calculate a cumulative desorption amount by accumulating an amount of HC desorbed from the catalyst per unit time, and estimate the activity of the catalyst based on the cumulative desorption amount. The air-fuel ratio control unit may be configured to set the target air-fuel ratio to a richer value when the cumulative desorption amount is equal to or larger than a predetermined value than when the cumulative desorption amount is less than the predetermined value.

In the exhaust gas control apparatus with the above configuration, the catalyst state estimation unit may be configured to set the amount of HC desorbed from the catalyst per unit time to zero when a temperature of the catalyst is lower than a predetermined desorption temperature.

In the exhaust gas control apparatus with the above configuration, the catalyst state estimation unit may be configured to increase the amount of HC desorbed from the catalyst per unit time as the temperature of the catalyst increases.

The exhaust gas control apparatus with the above configuration may further include an upstream air-fuel ratio sensor configured to detect the air-fuel ratio of the incoming exhaust gas. The catalyst state estimation unit may be configured to set the amount of HC desorbed from the catalyst per unit time to zero when the air-fuel ratio of the incoming exhaust gas detected by the upstream air-fuel ratio sensor is richer than a stoichiometric air-fuel ratio.

In the exhaust gas control apparatus with the above configuration, the catalyst state estimation unit may be configured to increase the amount of HC desorbed from the catalyst per unit time as a degree of leanness of the incoming exhaust gas detected by the upstream air-fuel ratio sensor increases.

In the exhaust gas control apparatus with the above configuration, the catalyst state estimation unit may be configured to increase the amount of HC desorbed from the catalyst per unit time as an amount of intake air of the internal combustion engine increases.

In the exhaust gas control apparatus with the above configuration, the air-fuel ratio control unit may be configured to set the target air-fuel ratio when the cumulative desorption amount is the predetermined value to a leaner value when an engine coolant temperature at a time the internal combustion engine is started is lower than a predetermined reference temperature than when the engine coolant temperature at the time the internal combustion engine is started is equal to or higher than the reference temperature.

A second aspect of the present disclosure relates to an exhaust gas control method for an exhaust gas control apparatus for an internal combustion engine that includes a catalyst, a downstream air-fuel ratio sensor, an air-fuel ratio control unit, and a catalyst state estimation unit. The catalyst is disposed in an exhaust passage of the internal combustion engine and is configured to store oxygen. The downstream air-fuel ratio sensor is configured to detect an air-fuel ratio of outgoing exhaust gas flowing out of the catalyst. The air-fuel ratio control unit is configured to control an air-fuel ratio of incoming exhaust gas flowing into the catalyst. The catalyst state estimation unit is configured to estimate activity of the catalyst. The exhaust gas control method includes: (i) controlling the air-fuel ratio of the incoming exhaust gas in such a manner that the air-fuel ratio of the outgoing exhaust gas detected by the downstream air-fuel ratio sensor is maintained at a target air-fuel ratio; and (ii) setting the target air-fuel ratio to a richer value when the activity of the catalyst is equal to or higher than a predetermined value than when the activity of the catalyst is lower than the predetermined value.

The exhaust gas control apparatus for an internal combustion engine and the exhaust gas control method for the exhaust gas control apparatus according to the present disclosure can reduce degradation in exhaust emissions due to the influence of hydrogen by performing appropriate air-fuel ratio control according to the activity of the catalyst.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 shows an example of a first air-fuel ratio setting map according to the second embodiment;

FIG. 11 shows an example of a second air-fuel ratio setting map according to the second embodiment;

FIG. 12 shows an example of a map showing the relationship between the temperature of a catalyst and a temperature correction factor according to the second embodiment; and FIG. 13 shows an example of a map showing the relationship between the air-fuel ratio of incoming exhaust gas and an air-fuel ratio correction factor according to the second embodiment.

DETAILED DESCRIPTION OF EMBODIMENTS

Hereinafter, embodiments of the present disclosure will be described in detail with reference to the drawings. In the following description, like constituent elements are denoted by like reference signs.

A first embodiment of the present disclosure will be described with reference to FIGS. 1 to 6.

Figure 1:
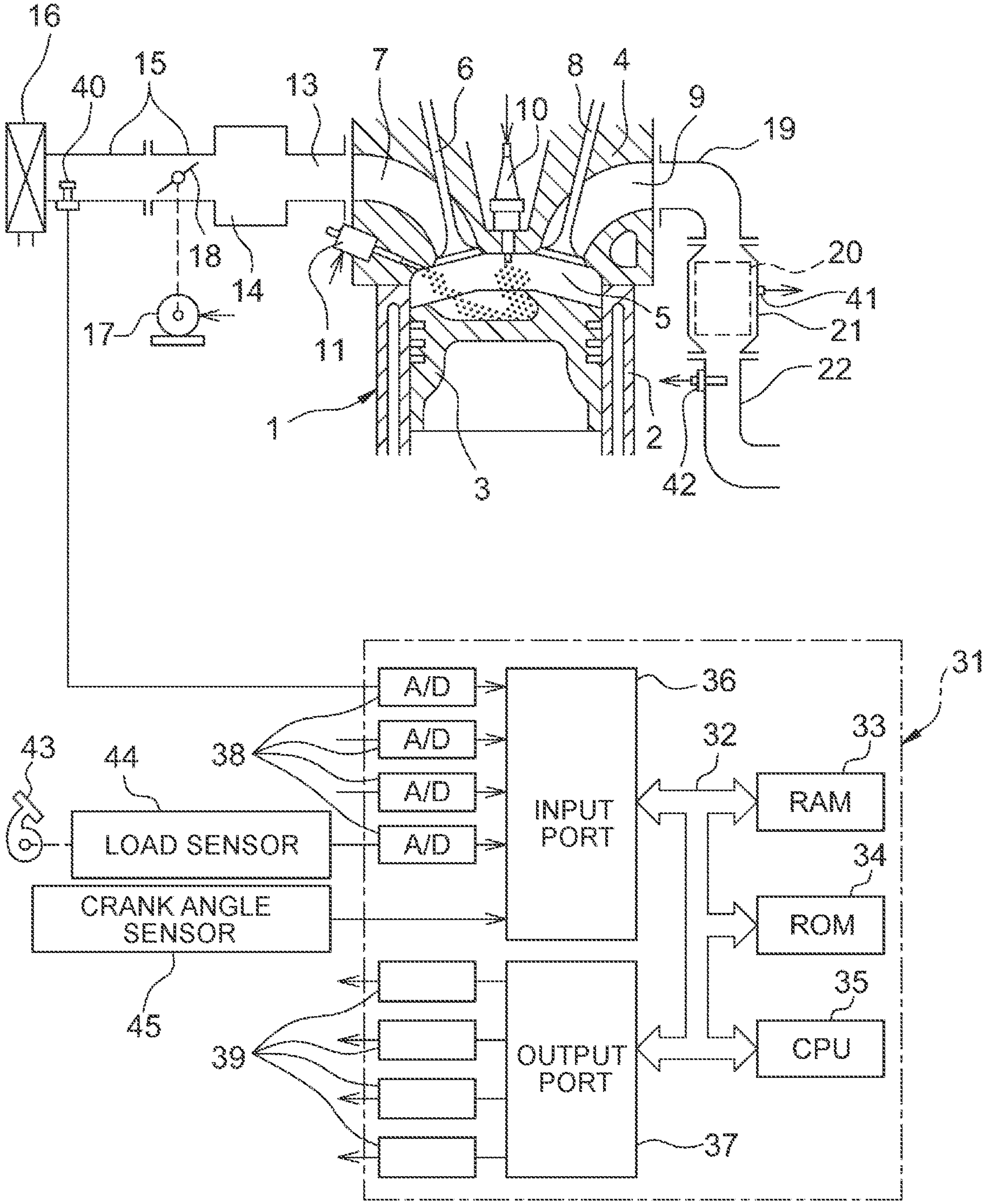
FIG. 1 schematically shows an internal combustion engine with an exhaust gas control apparatus for an internal combustion engine according to a first embodiment of the present disclosure.

First, the overall configuration of an internal combustion engine according to the first embodiment will be described. FIG. 1 schematically shows an internal combustion engine with an exhaust gas control apparatus for an internal combustion engine according to the first embodiment of the present disclosure. The internal combustion engine shown in FIG. 1 is a spark-ignition internal combustion engine. The internal combustion engine is mounted on a vehicle, and is used as a power source for the vehicle.

The internal combustion engine includes an engine body 1 that includes a cylinder block 2 and a cylinder head 4. A plurality of (e.g., four) cylinders is formed inside the cylinder block 2. A piston 3 that reciprocates in the axial direction of a cylinder is disposed in each cylinder. A combustion chamber 5 is formed between the piston 3 and the cylinder head 4.

An intake port 7 and an exhaust port 9 are formed in the cylinder head 4. The intake port 7 and the exhaust port 9 are connected to the combustion chamber 5.

The internal combustion engine further includes an intake valve 6 and an exhaust valve 8 that are disposed in the cylinder head 4. The intake valve 6 opens and closes the intake port 7. The exhaust valve 8 opens and closes the exhaust port 9.

The internal combustion engine further includes a spark plug 10 and a fuel injection valve 11. The spark plug 10 is disposed in the central portion of the inner wall surface of the cylinder head 4, and generates a spark in response to an ignition signal. The fuel injection valve 11 is disposed in the peripheral portion of the inner wall surface of the cylinder head 4, and injects fuel into the combustion chamber 5 in response to an injection signal. In the present embodiment, gasoline with a stoichiometric air-fuel ratio of 14.6 is used as fuel to be supplied to the fuel injection valve 11.

The internal combustion engine further includes an intake manifold 13, a surge tank 14, an intake pipe 15, an air cleaner 16, and a throttle valve 18. The intake port 7 of each cylinder is connected to the surge tank 14 via a corresponding intake manifold 13. The surge tank 14 is connected to the air cleaner 16 via the intake pipe 15. The intake port 7, the intake manifold 13, the surge tank 14, the intake pipe 15, etc. form an intake passage that guides air into the combustion chamber 5. The throttle valve 18 is disposed in the intake pipe 15 between the surge tank 14 and the air cleaner 16, and is driven by a throttle valve drive actuator 17 (e.g., a direct current (DC) motor). The throttle valve 18 is rotated by the throttle valve drive actuator 17. The throttle valve 18 can thus change the opening area of the intake passage according to the opening degree of the throttle valve 18.

The internal combustion engine further includes an exhaust manifold 19, a catalyst 20, a casing 21, and an exhaust pipe 22. The exhaust port 9 of each cylinder is connected to the exhaust manifold 19. The exhaust manifold 19 has a plurality of branches connected to the exhaust ports 9, and a collection portion where the branches are combined. The collection portion of the exhaust manifold 19 is connected to the casing 21 containing the catalyst 20. The casing 21 is connected to the exhaust pipe 22. The exhaust port 9, the exhaust manifold 19, the casing 21, the exhaust pipe 22, etc. form an exhaust passage that discharges exhaust gas generated by combustion of an air-fuel mixture in the combustion chamber 5.

The vehicle equipped with the internal combustion engine is provided with an electronic control unit (ECU) 31. As shown in FIG. 1, the ECU 31 is a digital computer, and includes a random-access memory (RAM) 33, a read-only memory (ROM) 34, a central processing unit (CPU; microprocessor) 35, an input port 36, and an output port 37. The RAM 33, the ROM 34, the CPU 35, the input port 36, and the output port 37 are connected to each other via a bidirectional bus 32. While one ECU 31 is provided in the present embodiment, a plurality of ECUs may be provided for each function.

The ECU 31 performs various types of control of the internal combustion engine based on, for example, outputs from various sensors installed in the vehicle or the internal combustion engine. Therefore, the outputs from the various sensors are sent to the ECU 31. In the present embodiment, outputs from an air flow meter 40, a temperature sensor 41, a downstream air-fuel ratio sensor 42, a load sensor 44, and a crank angle sensor 45 are sent to the ECU 31.

The air flow meter 40 is disposed in the intake passage of the internal combustion engine, specifically, in the intake pipe 15 upstream of the throttle valve 18. The air flow meter 40 detects the flow rate of air flowing in the intake passage. The air flow meter 40 is electrically connected to the ECU 31. An output from the air flow meter 40 is input to the input port 36 via a corresponding analog-to-digital (A/D) converter 38.

The temperature sensor 41 is disposed in the casing 21 containing the catalyst 20. The temperature sensor 41 detects the temperature of the catalyst 20 (bed temperature). The temperature sensor 41 is electrically connected to the ECU 31. An output from the temperature sensor 41 is input to the input port 36 via a corresponding A/D converter 38.

The downstream air-fuel ratio sensor 42 is disposed in the exhaust passage downstream of the catalyst 20, specifically, in the exhaust pipe 22. The downstream air-fuel ratio sensor 42 detects the air-fuel ratio of exhaust gas flowing in the exhaust pipe 22, that is, exhaust gas flowing out of the catalyst 20. The downstream air-fuel ratio sensor 42 is electrically connected to the ECU 31. An output from the downstream air-fuel ratio sensor 42 is input to the input port 36 via a corresponding A/D converter 38.

The load sensor 44 is connected to an accelerator pedal 43 in the vehicle equipped with the internal combustion engine, and detects the amount of depression of the accelerator pedal 43. The load sensor 44 is electrically connected to the ECU 31. An output from the load sensor 44 is input to the input port 36 via a corresponding A/D converter 38. The ECU 31 calculates an engine load based on the output from the load sensor 44.

The crank angle sensor 45 generates an output pulse every time a crankshaft of the internal combustion engine is rotated by a predetermined angle (e.g., 10 degrees). The crank angle sensor 45 is electrically connected to the ECU 31. An output from the crank angle sensor 45 is input to the input port 36. The ECU 31 calculates an engine speed based on the output from the crank angle sensor 45.

The output port 37 of the ECU 31 is connected to the spark plug 10, the fuel injection valve 11, and the throttle valve drive actuator 17 via corresponding drive circuits 39. The ECU 31 controls the spark plug 10, the fuel injection valve 11, and the throttle valve drive actuator 17. Specifically, the ECU 31 controls the ignition timing of the spark plug 10, the injection timing and injection amount of fuel that is injected from the fuel injection valve 11, and the opening degree of the throttle valve 18.

Although the internal combustion engine described above is a non-supercharged internal combustion engine that uses gasoline as fuel, the configuration of the internal combustion engine is not limited to the above configuration. Therefore, the specific configuration of the internal combustion engine, such as the cylinder arrangement, the manner of fuel injection, the configuration of intake and exhaust systems, the configuration of a valve train, and the presence or absence of a supercharger, may be different from the configuration shown in FIG. 1. For example, the fuel injection valve 11 may be disposed so as to inject fuel into the intake port 7. The internal combustion engine may be provided with a configuration that recirculates exhaust gas recirculation (EGR) gas from the exhaust passage to the intake passage.

The exhaust gas control apparatus for an internal combustion engine (hereinafter simply referred to as "exhaust gas control apparatus") according to the first embodiment of the present disclosure will be described below. The exhaust gas control apparatus includes the catalyst 20, the downstream air-fuel ratio sensor 42, and the ECU 31.

The catalyst 20 is disposed in the exhaust passage of the internal combustion engine, and is configured to control exhaust gas flowing in the exhaust passage. In the present embodiment, the catalyst 20 is a three-way catalyst that can store oxygen and that can control, for example, hydrocarbon (HC), carbon monoxide (CO), and nitrogen oxides (NOx) at the same time. The catalyst 20 includes a support (base) made of ceramic or metal, a noble metal having a catalytic action (e.g., platinum (Pt), palladium (Pd), or rhodium (Rh)), and a promoter having oxygen storage capability (e.g., ceria ($CeO_2$)). The noble metal and the promotor are supported on the support.

Figure 2:
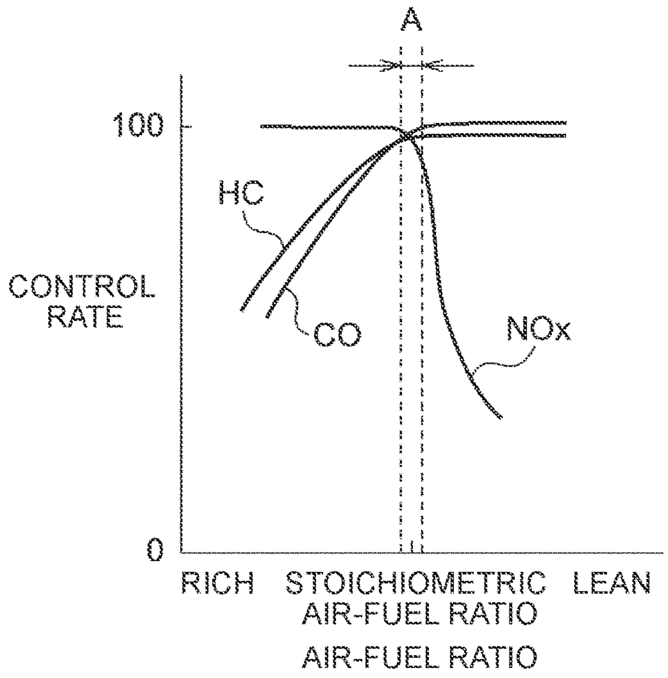
FIG. 2 shows an example of the control properties of a three-way catalyst.

FIG. 2 shows an example of the control properties of the three-way catalyst. As shown in FIG. 2, the HC, CO, and NOx control rates of the three-way catalyst are very high when the air-fuel ratio of exhaust gas that flows into the three-way catalyst is in a region around the stoichiometric air-fuel ratio (control window A in FIG. 2). Therefore, the catalyst 20 can effectively control HC, CO, and NOx when the air-fuel ratio of the exhaust gas is maintained near the stoichiometric air-fuel ratio.

The catalyst 20 stores or releases oxygen according to the air-fuel ratio of the exhaust gas by using the promoter. Specifically, the catalyst 20 stores excess oxygen in the exhaust gas when the air-fuel ratio of the exhaust gas is leaner than the stoichiometric air-fuel ratio. The catalyst 20 releases oxygen to oxidize HC and CO when the air-fuel ratio of the exhaust gas is richer than the stoichiometric air-fuel ratio. As a result, the air-fuel ratio on the surface of the catalyst 20 is maintained near the stoichiometric air-fuel ratio even when the air-fuel ratio of the exhaust gas slightly deviates from the stoichiometric air-fuel ratio. HC, CO, and NOx are thus effectively controlled by the catalyst 20.

Figure 3:
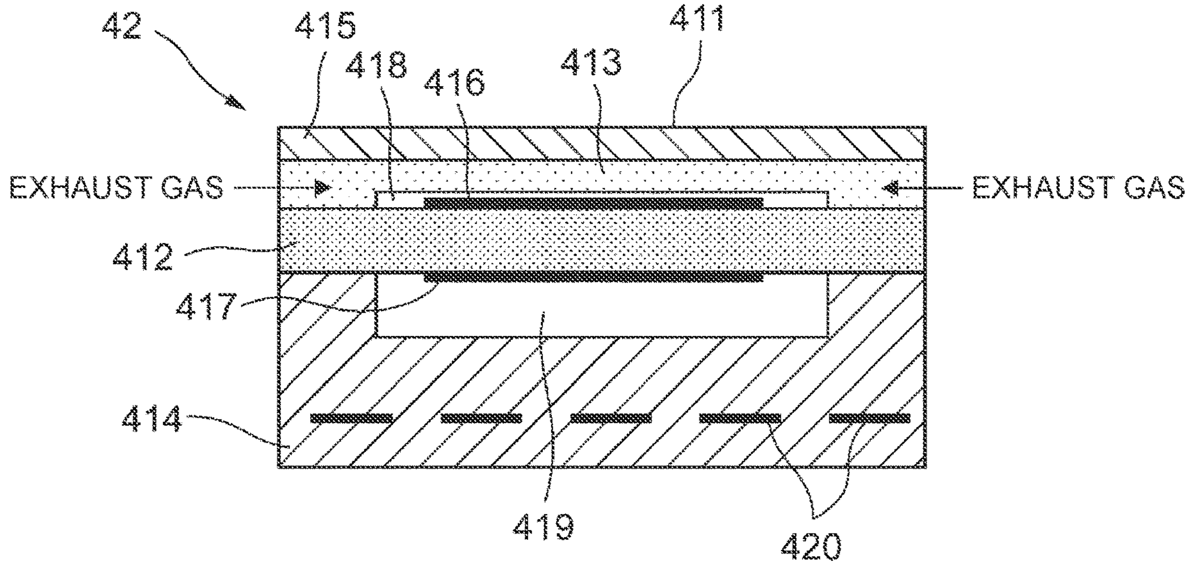
FIG. 3 is a partial sectional view of a downstream air-fuel ratio sensor shown in FIG. 1.

FIG. 3 is a partial sectional view of the downstream air-fuel ratio sensor 42. Since the downstream air-fuel ratio sensor 42 has a known configuration, the configuration of the downstream air-fuel ratio sensor 42 will be briefly described below.

The downstream air-fuel ratio sensor 42 includes a sensor element 411 and heaters 420. In the present embodiment, the downstream air-fuel ratio sensor 42 is a stacked air-fuel ratio sensor formed by stacking a plurality of layers. As shown in FIG. 3, the sensor element 411 includes a solid electrolyte layer 412, a diffusion control layer 413, a first impermeable layer 414, a second impermeable layer 415, an exhaust-side electrode 416, and an atmosphere-side electrode 417. A measured gas chamber 418 is formed between the solid electrolyte layer 412 and the diffusion control layer 413. An atmosphere chamber 419 is formed between the solid electrolyte layer 412 and the first impermeable layer 414.

Exhaust gas is introduced into the measured gas chamber 418 via the diffusion control layer 413 as gas to be measured. The atmosphere is introduced into the atmosphere chamber 419. When a voltage is applied to the sensor element 411, oxide ions move between the exhaust-side electrode 416 and the atmosphere-side electrode 417 according to the air-fuel ratio of the exhaust gas on the exhaust-side electrode 416. As a result, an output current from the sensor element 411 changes according to the air-fuel ratio of the exhaust gas.

Figure 4:
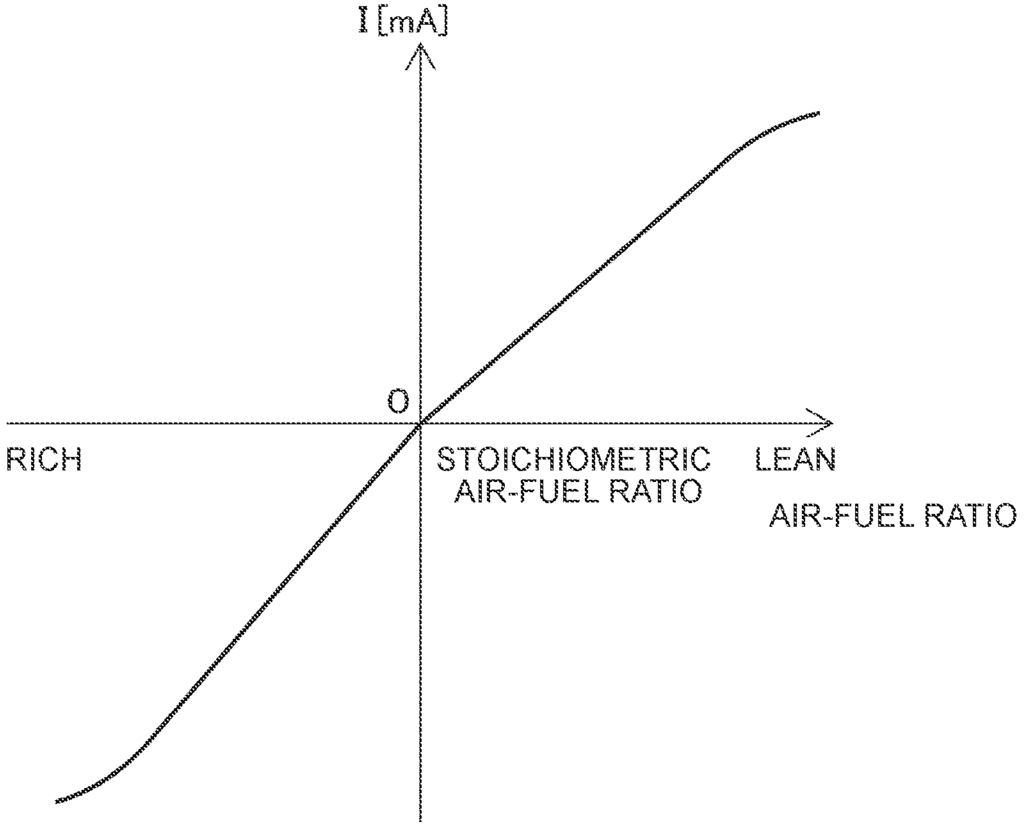
FIG. 4 shows the relationship between the air-fuel ratio of exhaust gas and the output current from a sensor element in the downstream air-fuel ratio sensor.

FIG. 4 shows the relationship between the air-fuel ratio of the exhaust gas and the output current I from the sensor element 411 in the downstream air-fuel ratio sensor 42. In the example shown in FIG. 4, a voltage of 0.45 V is applied to the sensor element 411. As can be seen from FIG. 4, the output current I is zero when the air-fuel ratio of the exhaust gas is the stoichiometric air-fuel ratio. In the downstream air-fuel ratio sensor 42, the output current I increases as the oxygen concentration of the exhaust gas increases, that is, as the air-fuel ratio of the exhaust gas is leaner. Therefore, the downstream air-fuel ratio sensor 42 can continuously (linearly) detect the air-fuel ratio of the exhaust gas.

In the present embodiment, a limiting current air-fuel ratio sensor is used as the downstream air-fuel ratio sensor 42. However, an air-fuel ratio sensor other than a limiting current air-fuel ratio sensor may be used as the downstream air-fuel ratio sensor 42 as long as an output current from the air-fuel ratio sensor changes linearly relative to the air-fuel ratio of the exhaust gas.

Figure 5:
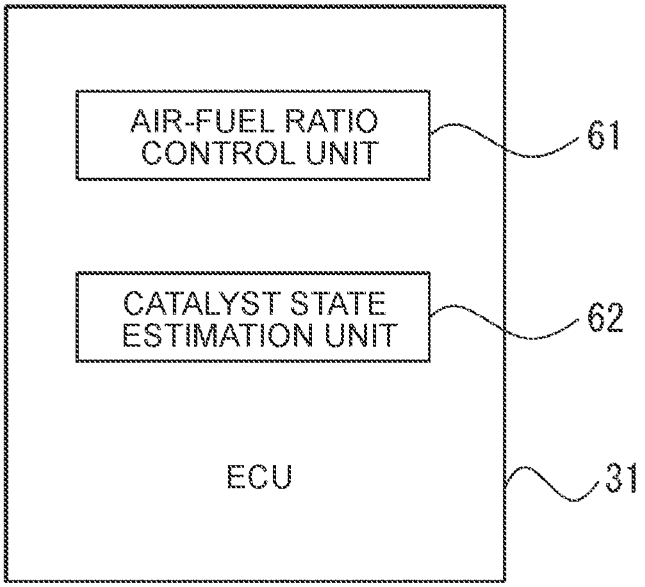
FIG. 5 is a functional block diagram of an electronic control unit (ECU) shown in FIG. 1.

FIG. 5 is a functional block diagram of the ECU 31. In the present embodiment, the ECU 31 includes an air-fuel ratio control unit 61 and a catalyst state estimation unit 62. The air-fuel ratio control unit 61 and the catalyst state estimation unit 62 are functional modules that are implemented by the CPU 35 of the ECU 31 executing programs stored in the ROM 34 of the ECU 31.

The air-fuel ratio control unit 61 controls the air-fuel ratio of exhaust gas that flows into the catalyst 20 (hereinafter referred to as "incoming exhaust gas"). In the present embodiment, the air-fuel ratio control unit 61 controls the air-fuel ratio of the incoming exhaust gas so that the output air-fuel ratio from the downstream air-fuel ratio sensor 42 is maintained at a target air-fuel ratio. For example, the air-fuel ratio control unit 61 feedback-controls the amount of fuel to be supplied to the combustion chamber 5 by proportional-integral-derivative (PID) control etc. so that an output air-fuel ratio from the downstream air-fuel ratio sensor 42 matches the target air-fuel ratio. The "output air-fuel ratio" means an air-fuel ratio corresponding to an output value from an air-fuel ratio sensor, that is, an air-fuel ratio detected by an air-fuel ratio sensor.

The catalyst state estimation unit 62 estimates the activity of the catalyst 20. Basically, the higher the temperature of the catalyst 20, the higher the activity of the catalyst 20. Therefore, in the present embodiment, the catalyst state estimation unit 62 estimates the activity of the catalyst 20 based on the temperature of the catalyst 20.

When the catalyst 20 is in a state suitable for controlling exhaust gas, exhaust gas is controlled by the catalyst 20, and the air-fuel ratio of exhaust gas that flows out of the catalyst 20 (hereinafter referred to as "outgoing exhaust gas") becomes the stoichiometric air-fuel ratio. Therefore, it is conceivable to control the air-fuel ratio of the incoming exhaust gas so that the output air-fuel ratio from the downstream air-fuel ratio sensor 42 disposed downstream of the catalyst 20 becomes the stoichiometric air-fuel ratio.

When there is an oxygen depletion region in the catalyst 20, however, a water-gas shift reaction given by the following formula (1) and a steam reforming reaction given by the following formula (2) occur, and hydrogen is produced in the catalyst 20.

$$CO+H_2O \rightarrow H_2+CO_2 \tag{1}$$

$$HC+H_2O \rightarrow CO+H_2 \tag{2}$$

As a result, exhaust gas containing hydrogen flows out of the catalyst 20 and flows into the downstream air-fuel ratio sensor 42. At this time, since the molecular weight of hydrogen is less than the molecular weight of oxygen, hydrogen in the exhaust gas passes through the diffusion control layer 413 and reaches the exhaust-side electrode 416 faster than oxygen in the exhaust gas. Therefore, the oxygen concentration of the exhaust gas on the exhaust-side electrode 416 becomes lower than the oxygen concentration of the exhaust gas in the exhaust passage. As a result, a deviation is caused in the output from the downstream air-fuel ratio sensor 42, and the output from the downstream air-fuel ratio sensor 42 deviates to a richer side from the actual value. Therefore, when hydrogen flows out of the catalyst 20, it is desirable to set the target air-fuel ratio to a value richer than the stoichiometric air-fuel ratio in order to maintain the catalyst 20 in the state suitable for controlling exhaust gas.

However, when the activity of the catalyst 20 is low, such as immediately after the internal combustion engine is started, the reactivities of the water-gas shift reaction (1) and the steam reforming reaction (2) decrease. As a result, the amount of hydrogen that is produced in the catalyst 20 decreases, and the amount of deviation of the output from the downstream air-fuel ratio sensor 42 decreases accordingly. That is, the amount of hydrogen that flows out of the catalyst 20 into the downstream air-fuel ratio sensor 42 changes according to the activity of the catalyst 20, and the amount of deviation of the output from the downstream air-fuel ratio sensor 42 changes accordingly.

Therefore, the air-fuel ratio control unit 61 sets the target air-fuel ratio to a richer value when the activity of the catalyst 20 is equal to or higher than a predetermined value than when the activity of the catalyst 20 is less than the predetermined value. That is, in the present embodiment, degradation in exhaust emissions due to the influence of hydrogen can be reduced by performing appropriate air-fuel ratio control according to the activity of the catalyst 20.

In the present embodiment, the catalyst state estimation unit 62 determines that the activity of the catalyst 20 is equal to or higher than the predetermined value when the temperature of the catalyst 20 is equal to or higher than a predetermined temperature. The catalyst state estimation unit 62 determines that the activity of the catalyst 20 is less than the predetermined value when the temperature of the catalyst 20 is less than the predetermined temperature. That is, the air-fuel ratio control unit 61 sets the target air-fuel ratio to a richer value when the temperature of the catalyst 20 is equal to or higher than the predetermined temperature than when the temperature of the catalyst 20 is less than the predetermined temperature.

Figure 6:
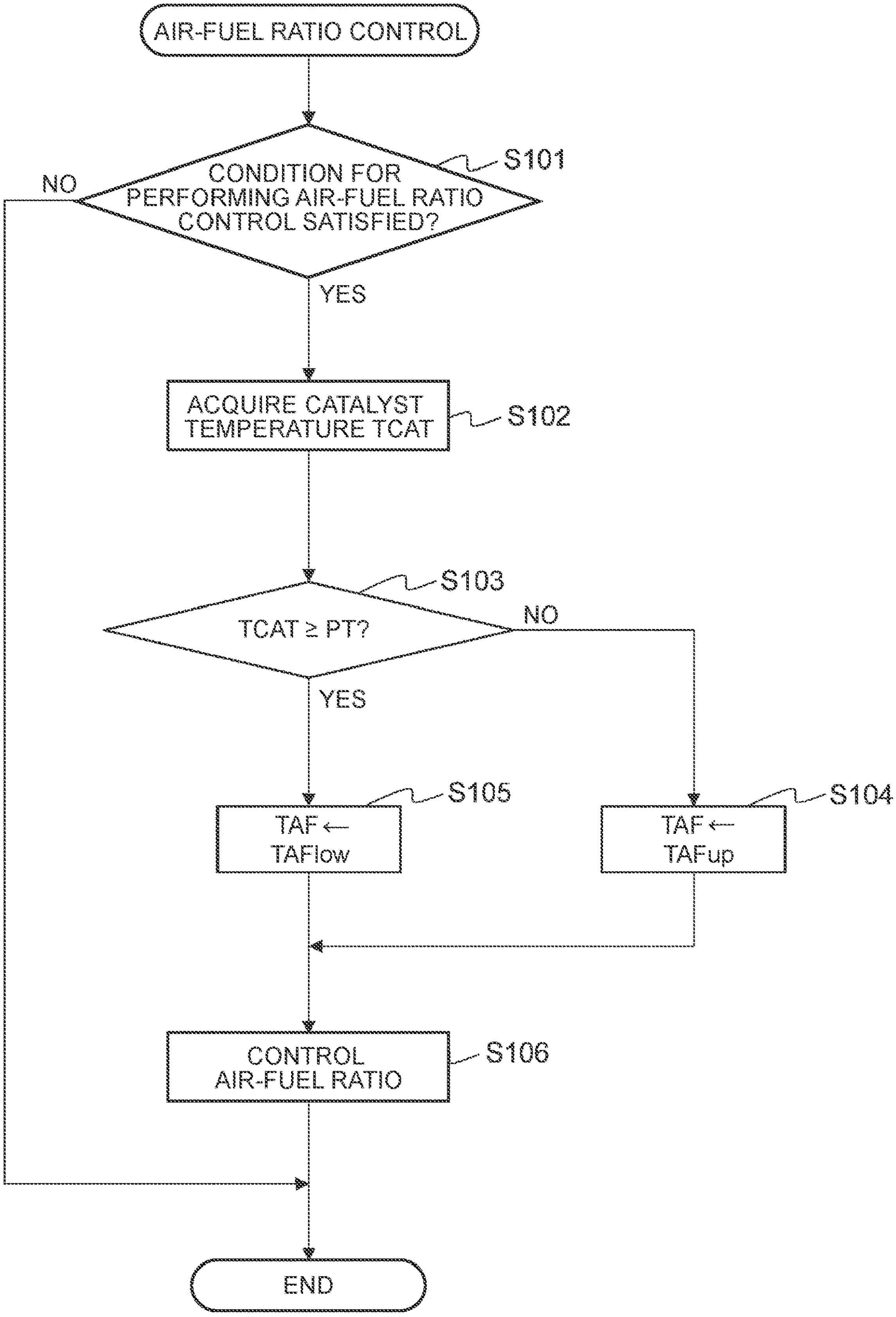
FIG. 6 is a flowchart of a control routine of air-fuel ratio control according to the first embodiment.

Next, a flowchart of the air-fuel ratio control will be described. The air-fuel ratio control described above will be described in detail below with reference to the flowchart in FIG. 6. FIG. 6 is a flowchart of a control routine of the air-fuel ratio control according to the first embodiment. This control routine is repeatedly executed by the ECU 31 at predetermined execution intervals.

First, in step S101, the air-fuel ratio control unit determines whether a condition for performing the air-fuel ratio control is satisfied. For example, the condition for performing the air-fuel ratio control is satisfied when the element temperature of the downstream air-fuel ratio sensor 42 is equal to or higher than a predetermined activation temperature. The element temperature of the downstream air-fuel ratio sensor 42 is calculated based on, for example, the impedance of the sensor element. The condition for performing the air-fuel ratio control may include, for example, the following conditions: a predetermined time has elapsed since the internal combustion engine was started, and a predetermined component of the internal combustion engine (such as the fuel injection valve 11, the catalyst 20, or the downstream air-fuel ratio sensor 42) is normal.

When it is determined in step S101 that the condition for performing the air-fuel ratio control is not satisfied, the control routine ends. When it is determined in step S101 that the condition for performing the air-fuel ratio control is satisfied, the control routine proceeds to step S102.

In step S102, the catalyst state estimation unit 62 acquires the temperature TCAT of the catalyst 20. For example, the catalyst state estimation unit 62 calculates the temperature TCAT of the catalyst 20 based on the output from the temperature sensor 41. The temperature sensor 41 may be mounted in the exhaust passage upstream or downstream of the catalyst 20. The catalyst state estimation unit 62 may calculate the temperature TCAT of the catalyst 20 based on predetermined state quantities of the internal combustion engine (e.g., engine coolant temperature, amount of intake air, engine load, etc.).

Next, in step S103, the air-fuel ratio control unit 61 determines whether the temperature TCAT of the catalyst 20 is equal to or higher than a predetermined temperature PT. The predetermined temperature PT is set to, for example, 300° C. to 600° C.

When it is determined in step S103 that the temperature TCAT of the catalyst 20 is lower than the predetermined temperature PT, the control routine proceeds to step S104. In step S104, the air-fuel ratio control unit 61 sets a target air-fuel ratio TAF to a predetermined upper set air-fuel ratio TAFup. The upper set air-fuel ratio TAFup is set to, for example, the stoichiometric air-fuel ratio (14.6).

When it is determined in step S103 that the temperature TCAT of the catalyst 20 is equal to or higher than the predetermined temperature PT, the control routine proceeds to step S105. In step S105, the air-fuel ratio control unit 61 sets the target air-fuel ratio TAF to a predetermined lower set air-fuel ratio TAFlow. The lower set air-fuel ratio TAFlow is an air-fuel ratio richer than the upper set air-fuel ratio TAFup, and is set to a value richer than the stoichiometric air-fuel ratio (e.g., 14.58).

After step S104 or S105, the control routine proceeds to step S106. In step S106, the air-fuel ratio control unit 61 controls the air-fuel ratio of the incoming exhaust gas so that the output air-fuel ratio from the downstream air-fuel ratio sensor 42 is maintained at the target air-fuel ratio TAF set in step S104 or S105. The control routine ends after step S106.

As described above, in the present embodiment, the target air-fuel ratio is switched from the stoichiometric air-fuel ratio to a value richer than the stoichiometric air-fuel ratio as the internal combustion engine warms up. However, the air-fuel ratio control unit 61 may change the target air-fuel ratio to three or more richer values in stages (stepwise) as the temperature of the catalyst 20 increases. The air-fuel ratio control unit 61 may linearly change the target air-fuel ratio to a richer side as the temperature of the catalyst 20 increases.

Next, a second embodiment of the present disclosure will be described. The configuration and control of an exhaust gas control apparatus according to the second embodiment are basically the same as those of the exhaust gas control apparatus according to the first embodiment except for the points that will be described below. Therefore, the second embodiment of the present disclosure will be described below focusing on the differences from the first embodiment.

Figure 7:
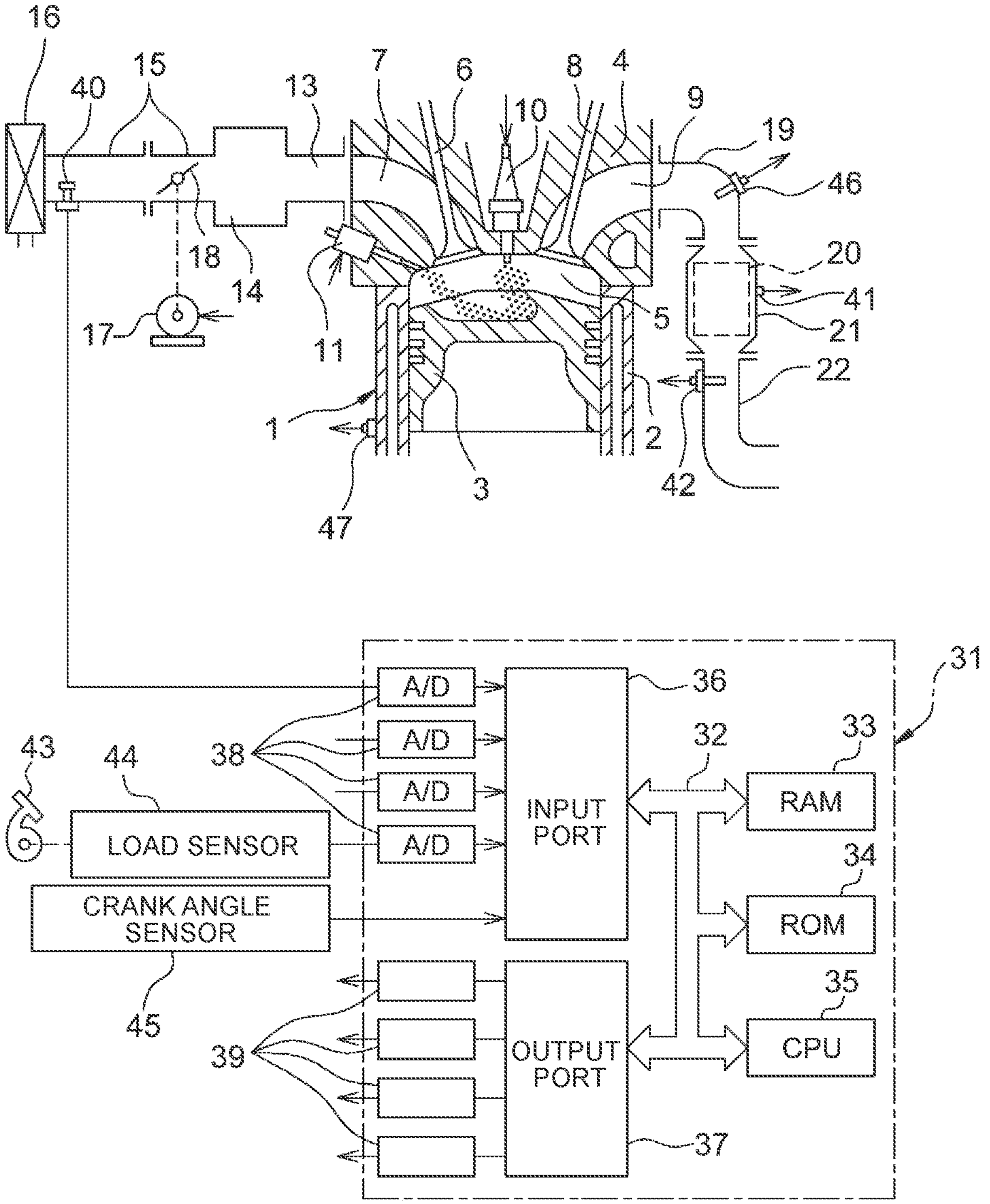
FIG. 7 schematically shows an internal combustion engine with an exhaust gas control apparatus for an internal combustion engine according to a second embodiment of the present disclosure.

FIG. 7 schematically shows an internal combustion engine with the exhaust gas control apparatus for an internal combustion engine according to the second embodiment of the present disclosure. In the second embodiment, the internal combustion engine is further provided with an upstream air-fuel ratio sensor 46 and a coolant temperature sensor 47. In addition to outputs from the air flow meter 40, the temperature sensor 41, the downstream air-fuel ratio sensor 42, the load sensor 44, and the crank angle sensor 45, outputs from the upstream air-fuel ratio sensor 46 and the coolant temperature sensor 47 are sent to the ECU 31.

The upstream air-fuel ratio sensor 46 is disposed in the exhaust passage upstream of the catalyst 20, specifically, in the collection portion of the exhaust manifold 19. The upstream air-fuel ratio sensor 46 detects the air-fuel ratio of exhaust gas flowing in the exhaust manifold 19, that is, exhaust gas discharged from the cylinders of the internal combustion engine and flowing into the catalyst 20. The upstream air-fuel ratio sensor 46 has a configuration similar to that of the downstream air-fuel ratio sensor 42, and can continuously (linearly) detect the air-fuel ratio of the exhaust gas. The upstream air-fuel ratio sensor 46 is electrically connected to the ECU 31. An output from the upstream air-fuel ratio sensor 46 is input to the input port 36 via a corresponding A/D converter 38.

The coolant temperature sensor 47 is disposed in a coolant passage of the internal combustion engine, and detects the temperature of a coolant of the internal combustion engine (engine coolant temperature). The coolant temperature sensor 47 is electrically connected to the ECU 31. An output from the coolant temperature sensor 47 is input to the input port 36 via a corresponding A/D converter 38.

Basically, the higher the temperature of the catalyst 20, the higher the activity of the catalyst 20, as described above. The inventors found that HC in the exhaust pipe 22 is adsorbed on the catalyst 20 in a low temperature state such as before the internal combustion engine is started, and that the larger the amount of HC adsorbed on the catalyst 20, the lower the activity of the catalyst 20.

Therefore, in the second embodiment, the catalyst state estimation unit 62 calculates a cumulative desorption amount by accumulating the amount of HC desorbed from the catalyst 20 per unit time, and estimates the activity of the catalyst 20 based on the cumulative desorption amount. The catalyst state estimation unit 62 determines that the activity of the catalyst 20 is equal to or higher than the predetermined value when the cumulative desorption amount is equal to or higher than a predetermined value. The catalyst state estimation unit 62 determines that the activity of the catalyst 20 is less than the predetermined value when the cumulative desorption amount is less than the predetermined value. That is, the air-fuel ratio control unit 61 sets the target air-fuel ratio to a richer value when the cumulative desorption amount is equal to or higher than the predetermined value than when the cumulative desorption amount is less than the predetermined value. In the second embodiment, the activity of the catalyst 20 is estimated more accurately. Therefore, the target air-fuel ratio can be set to a more appropriate value, and degradation in exhaust emissions due to the influence of hydrogen can further be reduced.

For example, the catalyst state estimation unit 62 calculates the amount of HC desorbed from the catalyst 20 per unit time (hereinafter referred to as "unit desorption amount") based on at least one of the following values: the temperature of the catalyst 20, the air-fuel ratio of the incoming exhaust gas, and the amount of intake air of the internal combustion engine. When the internal combustion engine warms up and the temperature of the catalyst 20 reaches a desorption temperature, HC adsorbed on the catalyst 20 desorbs from the catalyst 20. The desorption of HC is accelerated as the temperature of the catalyst 20 increases. Therefore, the catalyst state estimation unit 62 sets the unit desorption amount to zero when the temperature of the catalyst 20 is lower than a predetermined desorption temperature. The catalyst state estimation unit 62 increases the unit desorption amount as the temperature of the catalyst 20 increases.

HC adsorbed on the catalyst 20 desorbs from the catalyst 20 when the air-fuel ratio of the incoming exhaust gas is equal to or higher than the stoichiometric air-fuel ratio. The desorption of HC is accelerated as the degree of leanness of the incoming exhaust gas increases. Therefore, the catalyst state estimation unit 62 sets the unit desorption amount to zero when the output air-fuel ratio from the upstream air-fuel ratio sensor 46 is richer than the stoichiometric air-fuel ratio. The catalyst state estimation unit 62 increases the unit desorption amount as the degree of leanness of the output air-fuel ratio from the upstream air-fuel ratio sensor 46 increases. The "degree of leanness" means the difference between an air-fuel ratio leaner than the stoichiometric air-fuel ratio and the stoichiometric air-fuel ratio.

The larger the amount of intake air of the internal combustion engine, the larger the amount of oxygen flowing into the catalyst 20 and the more the desorption of HC from the catalyst 20 is accelerated. Therefore, the catalyst state estimation unit 62 increases the unit desorption amount as the amount of intake air of the internal combustion engine increases.

It is expected that a large amount of HC has been adsorbed on the catalyst 20 when the internal combustion engine is cold-started. When the initial value of the amount of HC adsorbed on the catalyst 20 is large, more HC needs to be desorbed from the catalyst 20 in order to activate the catalyst 20 than when the initial value of the amount of HC adsorbed on the catalyst 20 is small. That is, even if the cumulative desorption amount is the same, the activity of the catalyst 20 is lower when the initial value of HC adsorbed on the catalyst 20 is large than when the initial value of HC adsorbed on the catalyst 20 is small. Therefore, when the engine coolant temperature at the time the internal combustion engine is started is lower than a predetermined reference temperature, the air-fuel ratio control unit 61 sets a target air-fuel ratio when the cumulative desorption amount is the predetermined value to a leaner value than when the engine coolant temperature at the time the internal combustion engine is started is equal to or higher than the reference temperature.

Figure 8:
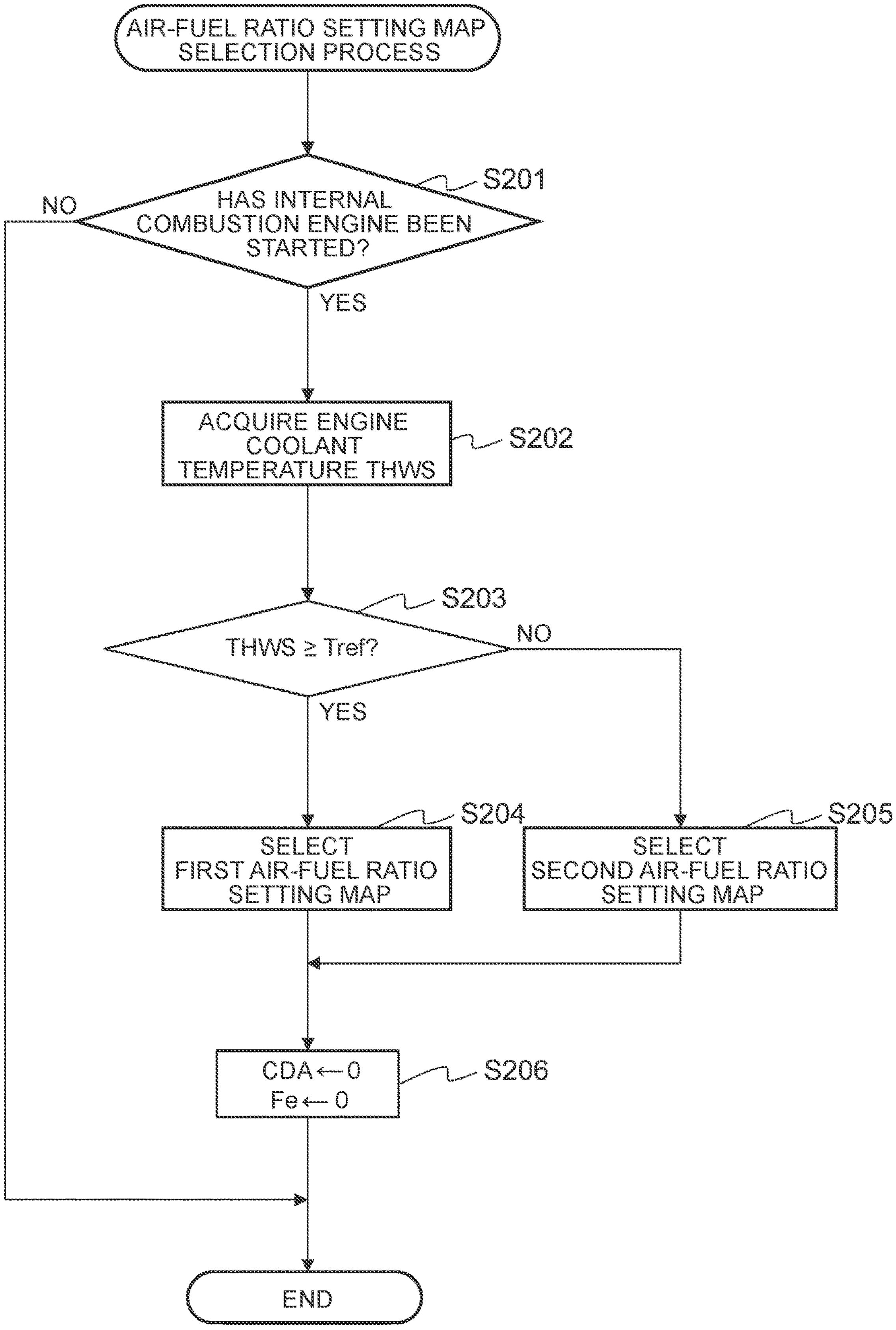
FIG. 8 is a flowchart of a control routine of an air-fuel ratio setting map selection process according to the second embodiment.

A processing flow for the control described above will be described below with reference to the flowcharts of FIGS. 8, 9A, and 9B. FIG. 8 is a flowchart of a control routine of an air-fuel ratio setting map selection process according to the second embodiment. This control routine is repeatedly executed by the ECU 31 at predetermined execution intervals.

First, in step S201, the catalyst state estimation unit 62 determines whether the internal combustion engine has been started between the previous control routine and the current control routine. When it is determined that the internal combustion engine has not been started, the control routine ends. When it is determined that the internal combustion engine has been started, the control routine proceeds to step S202.

In step S202, the catalyst state estimation unit 62 acquires the engine coolant temperature THWS at the time the internal combustion engine was started. The engine coolant temperature THWS is detected by, for example, the coolant temperature sensor 47.

Next, in step S203, the catalyst state estimation unit 62 determines whether the engine coolant temperature THWS is equal to or higher than a predetermined reference temperature Tref (e.g., 60° C.). When it is determined that the engine coolant temperature THWS is equal to or higher than the reference temperature Tref, that is, when it is determined that the amount of HC adsorbed on the catalyst 20 is small, the control routine proceeds to step S204.

In step S204, the catalyst state estimation unit 62 selects a first air-fuel ratio setting map as a map for setting the target air-fuel ratio based on the cumulative desorption amount. FIG. 10 shows an example of the first air-fuel ratio setting map. The first air-fuel ratio setting map shows the relationship between the cumulative desorption amount CDA and the target air-fuel ratio TAF. In the first air-fuel ratio setting map, the target air-fuel ratio TAF is changed to a richer side in stages (stepwise) as the cumulative desorption amount CDA increases.

When it is determined in step S203 that the engine coolant temperature THWS is lower than the reference temperature Tref, that is, when it is determined in step S203 that the amount of HC adsorbed on the catalyst 20 is large, the control routine proceeds to step S205. In step S205, the catalyst state estimation unit 62 selects a second air-fuel ratio setting map as a map for setting the target air-fuel ratio based on the cumulative desorption amount.

FIG. 11 shows an example of the second air-fuel ratio setting map. The second air-fuel ratio setting map shows the relationship between the cumulative desorption amount CDA and the target air-fuel ratio TAF. In the second air-fuel ratio setting map, the target air-fuel ratio TAF is changed to a richer side in stages (stepwise) as the cumulative desorption amount CDA increases. In the second air-fuel ratio setting map, the target air-fuel ratio TAF when the cumulative desorption amount CDA is a predetermined value (e.g., 30000) is leaner than in the first air-fuel ratio setting map. In other words, in the second air-fuel ratio setting map, the rate of decrease in target air-fuel ratio TAF with an increase in cumulative desorption amount CDA is lower than in the first air-fuel ratio setting map.

As can be seen from the first air-fuel ratio setting map and the second air-fuel ratio setting map, in the present embodiment, the air-fuel ratio control unit 61 changes the target air-fuel ratio TAF within a range equal to or lower than the stoichiometric air-fuel ratio, based on the cumulative desorption amount CDA. In the first air-fuel ratio setting map and the second air-fuel ratio setting map, the target air-fuel ratio TAF may be linearly changed to a richer side as the cumulative desorption amount CDA increases.

After step S204 or S205, the control routine proceeds to step S206. In step S206, the catalyst state estimation unit 62 resets the cumulative desorption amount CDA to zero and clears a desorption completion flag Fe. The control routine ends after step S206.

Figure 9A:
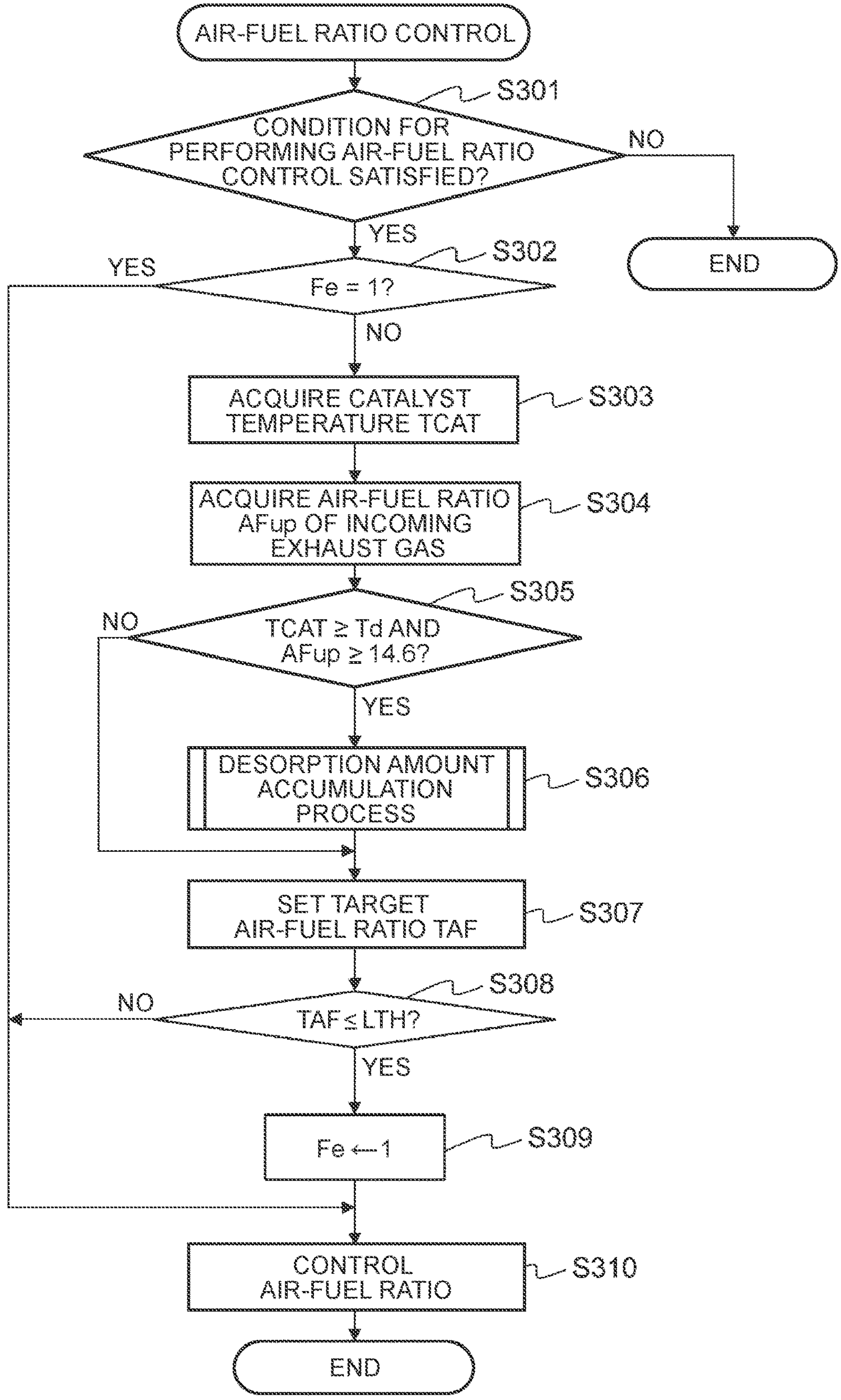
FIG. 9A is a flowchart of a control routine of air-fuel ratio control according to the second embodiment.
Figure 9B:
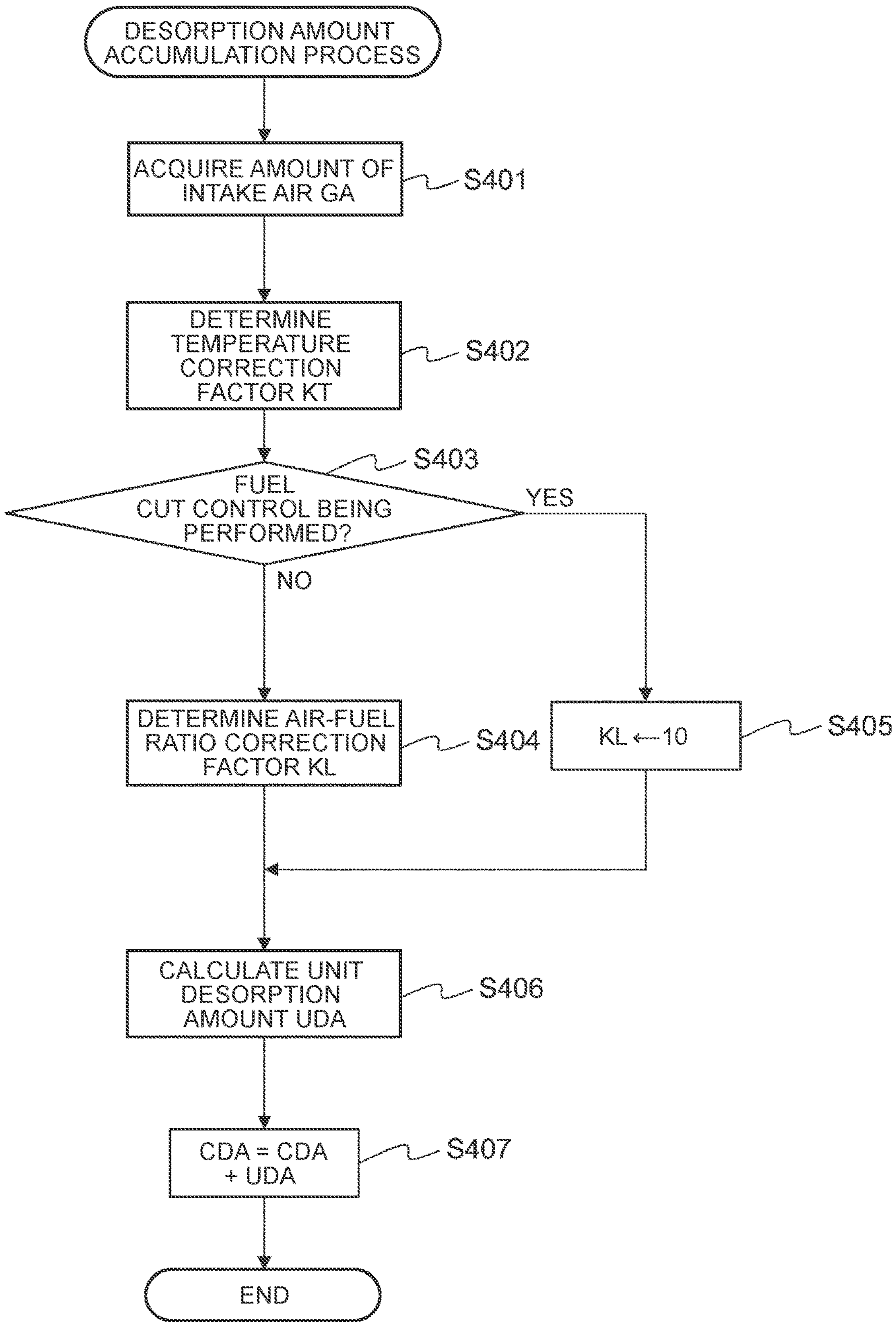
FIG. 9B is a flowchart of a control routine of a desorption amount accumulation process according to the second embodiment.

FIGS. 9A and 9B are flowcharts of a control routine of the air-fuel ratio control according to the second embodiment. This control routine is repeatedly executed by the ECU 31 at predetermined execution intervals.

First, in step S301, the air-fuel ratio control unit determines whether a condition for performing the air-fuel ratio control is satisfied. For example, the condition for performing the air-fuel ratio control is satisfied when the element temperatures of the upstream air-fuel ratio sensor 46 and the downstream air-fuel ratio sensor 42 are equal to or higher than a predetermined activation temperature. The element temperatures of the upstream air-fuel ratio sensor 46 and the downstream air-fuel ratio sensor 42 are each calculated based on, for example, the impedance of the sensor element. The condition for executing the air-fuel ratio control may include, for example, the following conditions: a predetermined time has elapsed since the internal combustion engine was started, and a predetermined component of the internal combustion engine (such as the fuel injection valve 11, the catalyst 20, the upstream air-fuel ratio sensor 46, or the downstream air-fuel ratio sensor 42) is normal.

When it is determined in step S301 that the condition for performing the air-fuel ratio control is not satisfied, the control routine ends. When it is determined in step S301 that the condition for performing the air-fuel ratio control is satisfied, the control routine proceeds to step S302.

In step S302, the air-fuel ratio control unit 61 determines whether the desorption completion flag Fe is 1. When it is determined that the desorption completion flag Fe is zero, the control routine proceeds to step S303.

In step S303, the catalyst state estimation unit 62 acquires the temperature TCAT of the catalyst 20, as in step S102 of FIG. 6.

Next, in step S304, the catalyst state estimation unit 62 acquires the air-fuel ratio AFup of the incoming exhaust gas. The air-fuel ratio AFup of the incoming exhaust gas is detected by the upstream air-fuel ratio sensor 46.

Thereafter, in step S305, the catalyst state estimation unit 62 determines whether the temperature TCAT of the catalyst 20 is equal to or higher than a predetermined desorption temperature Td and the air-fuel ratio AFup of the incoming exhaust gas is equal to or higher than the stoichiometric air-fuel ratio. When it is determined that the temperature TCAT of the catalyst 20 is equal to or higher than the predetermined desorption temperature Td and the air-fuel ratio AFup of the incoming exhaust gas is equal to or higher than the stoichiometric air-fuel ratio, the control routine proceeds to step S306.

In step S306, a subroutine shown in FIG. 9B is executed. FIG. 9B is a flowchart of a control routine of a desorption amount accumulation process.

First, in step S401, the catalyst state estimation unit 62 acquires the amount of intake air GA of the internal combustion engine. The amount of intake air GA is detected by the air flow meter 40.

Next, in step S402, the catalyst state estimation unit 62 determines a temperature correction factor KT to be used to calculate the unit desorption amount, based on the temperature TCAT of the catalyst 20. The larger the temperature correction factor KT, the larger the unit desorption amount. For example, the catalyst state estimation unit 62 determines the temperature correction factor KT using a map showing the relationship between the temperature TCAT of the catalyst 20 and the temperature correction factor KT.

FIG. 12 shows an example of the map showing the relationship between the temperature TCAT of the catalyst 20 and the temperature correction factor KT. In this map, when the temperature TCAT of the catalyst 20 is in the range of 300° C. to 800° C., the temperature correction factor KT is increased in stages (stepwise) as the temperature TCAT of the catalyst 20 increases.

Thereafter, in step S403, the catalyst state estimation unit 62 determines whether fuel cut control is being performed. The air-fuel ratio control unit 61 performs the fuel cut control when a predetermined condition for performing the fuel cut control is satisfied. The fuel cut control is control in which fuel supply to the combustion chamber 5 is stopped while the internal combustion engine is in operation. For example, the condition for performing the fuel cut control is satisfied when the amount of depression of the accelerator pedal 43 is zero or substantially zero (i.e. the engine load is zero or substantially zero) and the engine speed is equal to or higher than a predetermined value that is higher than the engine speed during idling.

When it is determined in step S403 that the fuel cut control is not being performed, the control routine proceeds to step S404. In step S404, the catalyst state estimation unit 62 determines an air-fuel ratio correction factor KL to be used to calculate the unit desorption amount, based on the air-fuel ratio AFup of the incoming exhaust gas detected by the upstream air-fuel ratio sensor 46. The larger the air-fuel ratio correction factor KL, the larger the unit desorption amount. For example, the catalyst state estimation unit 62 determines the air-fuel ratio correction factor KL using a map showing the relationship between the air-fuel ratio AFup of the incoming exhaust gas and the air-fuel ratio correction factor KL.

FIG. 13 shows an example of the map showing the relationship between the air-fuel ratio AFup of the incoming exhaust gas and the air-fuel ratio correction factor KL. In this map, when the air-fuel ratio AFup of the incoming exhaust gas is in the range of the stoichiometric air-fuel ratio (14.6) to 16, the air-fuel ratio correction factor KL is increased in stages (stepwise) as the air-fuel ratio AFup of the incoming exhaust gas becomes leaner.

When it is determined in step S403 that the fuel cut control is being performed, the control routine proceeds to step S405. In this case, desorption of HC proceeds rapidly due to a large amount of oxygen being supplied to the catalyst 20 during the fuel cut control. Therefore, in step S405, the catalyst state estimation unit 62 sets the air-fuel ratio correction factor KL to a larger value (e.g., 10) than the values shown in the map of FIG. 13.

After step S404 or S405, the catalyst state estimation unit 62 calculates the unit desorption amount UDA in step S406. For example, the catalyst state estimation unit 62 calculates the unit desorption amount UDA by multiplying the amount of intake air GA of the internal combustion engine by the temperature correction factor KT and the air-fuel ratio correction factor KL (UDA=GA×KT×KL).

Subsequently, in step S407, the catalyst state estimation unit 62 updates the cumulative desorption amount CDA by adding the unit desorption amount UDA to the current value of the cumulative desorption amount CDA. After step S407, the subroutine of FIG. 9B ends, and the control routine proceeds to step S307 in FIG. 9A. When it is determined in step S305 that the temperature TCAT of the catalyst 20 is lower than the predetermined desorption temperature Td or the air-fuel ratio AFup of the incoming exhaust gas is richer than the stoichiometric air-fuel ratio, the control routine skips step S306 and proceeds to step S307.

In step S307, the air-fuel ratio control unit 61 calculates the target air-fuel ratio TAF based on the cumulative desorption amount CDA. At this time, the air-fuel ratio control unit 61 sets the target air-fuel ratio TAF based on the cumulative desorption amount CDA by using the air-fuel ratio setting map selected in step S204 or S205 in FIG. 8.

Thereafter, in step S308, the air-fuel ratio control unit 61 determines whether the target air-fuel ratio TAF is equal to or less than a predetermined lower limit value LTH. The lower limit value LTH is the value of the target air-fuel ratio TAF that is set when it is determined that almost all HC has desorbed from the catalyst 20. The lower limit value LTH is, for example, 14.58.

When it is determined in step S308 that the target air-fuel ratio TAF is equal to or less than the lower limit value LTH, the control routine proceeds to step S309. In step S309, the air-fuel ratio control unit 61 sets the desorption completion flag Fe to 1. After step S309, the control routine proceeds to step S310. When it is determined in step S308 that the target air-fuel ratio TAF is leaner than the lower limit value LTH, the control routine skips step S309 and proceeds to step S310.

In step S310, the air-fuel ratio control unit 61 controls the air-fuel ratio of the incoming exhaust gas so that the output air-fuel ratio from the downstream air-fuel ratio sensor 42 is maintained at the target air-fuel ratio TAF set in step S307. The control routine ends after step S310.

When it is determined in step S302 that the desorption completion flag Fe is 1, the control routine skips steps S303 to S309 and proceeds to step S310. In this case, the air-fuel ratio control unit 61 controls the air-fuel ratio of the incoming exhaust gas so that the output air-fuel ratio from the downstream air-fuel ratio sensor 42 is maintained at the target air-fuel ratio TAF set to the lower limit value LTH.

Although the preferred embodiments of the present disclosure have been described above, the present disclosure is not limited to these embodiments, and various modifications and alterations can be made within the scope of the claims. For example, a downstream catalyst that is similar to the catalyst 20 may be disposed in the exhaust passage downstream of the catalyst 20 in the internal combustion engine.

What is claimed is:

1. An exhaust gas control apparatus for an internal combustion engine, the exhaust gas control apparatus comprising:

a catalyst disposed in an exhaust passage of the internal combustion engine and configured to store oxygen;

a downstream air-fuel ratio sensor configured to detect an air-fuel ratio of outgoing exhaust gas flowing out of the catalyst;

an air-fuel ratio control unit configured to control an air-fuel ratio of incoming exhaust gas flowing into the catalyst; and a catalyst state estimation unit that is configured to calculate a cumulative desorption amount by accumulating an amount of HC desorbed from the catalyst per unit time and configured to estimate activity of the catalyst based on the cumulative desorption amount, wherein the air-fuel ratio control unit is configured to control the air-fuel ratio of the incoming exhaust gas such that the air-fuel ratio of the outgoing exhaust gas detected by the downstream air-fuel ratio sensor is maintained at a target air-fuel ratio, and the air-fuel ratio control unit is configured to set the target air-fuel ratio to a richer value when the cumulative desorption amount is equal to or larger than a predetermined value than when the cumulative desorption amount is less than the predetermined value.

2. The exhaust gas control apparatus according to claim 1, wherein the catalyst state estimation unit is configured to set the amount of HC desorbed from the catalyst per unit time to zero when a temperature of the catalyst is lower than a predetermined desorption temperature.

3. The exhaust gas control apparatus according to claim 2, wherein the catalyst state estimation unit is configured to increase the amount of HC desorbed from the catalyst per unit time as the temperature of the catalyst increases.

4. The exhaust gas control apparatus according to claim 1, further comprising an upstream air-fuel ratio sensor configured to detect the air-fuel ratio of the incoming exhaust gas, wherein the catalyst state estimation unit is configured to set the amount of HC desorbed from the catalyst per unit time to zero when the air-fuel ratio of the incoming exhaust gas detected by the upstream air-fuel ratio sensor is richer than a stoichiometric air-fuel ratio.

5. The exhaust gas control apparatus according to claim 4, wherein the catalyst state estimation unit is configured to increase the amount of HC desorbed from the catalyst per unit time as a degree of leanness of the incoming exhaust gas detected by the upstream air-fuel ratio sensor increases.

6. The exhaust gas control apparatus according to claim 1, wherein the catalyst state estimation unit is configured to increase the amount of HC desorbed from the catalyst per unit time as an amount of intake air of the internal combustion engine increases.

7. The exhaust gas control apparatus according to claim 1, wherein the air-fuel ratio control unit is configured to set the target air-fuel ratio when the cumulative desorption amount is the predetermined value to a leaner value when an engine coolant temperature at a time the internal combustion engine is started is lower than a predetermined reference temperature than when the engine coolant temperature at the time the internal combustion engine is started is equal to or higher than the predetermined reference temperature.

8. An exhaust gas control method for an exhaust gas control apparatus for an internal combustion engine, the exhaust gas control apparatus including a catalyst disposed in an exhaust passage of the internal combustion engine and configured to store oxygen, a downstream air-fuel ratio sensor configured to detect an air-fuel ratio of outgoing exhaust gas flowing out of the catalyst, an air-fuel ratio control unit configured to control an air-fuel ratio of incoming exhaust gas flowing into the catalyst, and a catalyst state estimation unit that is configured to calculate a cumulative desorption amount by accumulating an amount of HC desorbed from the catalyst per unit time and configured to estimate activity of the catalyst based on the cumulative desorption amount, the exhaust gas control method comprising:

controlling the air-fuel ratio of the incoming exhaust gas in such a manner that the air-fuel ratio of the outgoing exhaust gas detected by the downstream air-fuel ratio sensor is maintained at a target air-fuel ratio; and setting the target air-fuel ratio to a richer value when the cumulative desorption amount is equal to or larger than a predetermined value than when the cumulative desorption amount is less than the predetermined value.

* * * * *